(No Model.)

S. EVERSHED.
ELECTRIC MEASURING INSTRUMENT.

No. 478,097. Patented July 5, 1892.

Witnesses:
E. B. Bolton
M. A. Walsh.

Inventor:
Sydney Evershed
By Richards &
his Attorneys.

UNITED STATES PATENT OFFICE.

SYDNEY EVERSHED, OF LONDON, ENGLAND.

ELECTRIC MEASURING-INSTRUMENT.

SPECIFICATION forming part of Letters Patent No. 478,097, dated July 5, 1892.

Application filed December 18, 1891. Serial No. 415,489. (No model.) Patented in England February 2, 1887, No. 1,628.

*To all whom it may concern:*

Be it known that I, SYDNEY EVERSHED, residing at London, England, have invented an Improvement in Electric Measuring-Instruments, (which has been patented in Great Britain and Ireland under No. 1,628, dated the 2d day of February, 1887,) of which the following is a specification.

My invention relates to electro-magnetic measuring-instruments, in several of which as heretofore made a small mass of iron attached to an arbor is attracted by the current to be measured flowing in a coil against the attraction of gravity or a spring. The maximum rotation and range of readings are usually small in such instruments, and the mass of the movable system being large compared with the forces acting on the movable iron small variations of the current in the coil produce large oscillations of the movable system.

The objects of my invention are, first, to increase the maximum rotation to ninety degrees or more; second, to facilitate the construction of electro-magnetic instruments with any desired range of readings within certain limits, and, third, to check the oscillations in such instruments.

According to my invention a small mass of magnetic material within a coil is attached to an arbor lying along or parallel to the axis of the coil, and the magnetic field within the coil is directed and distributed by means of pieces of magnetic material or poles fixed within the coil for the purpose of giving the instrument the range of readings and the rotation required, and also for the purpose of increasing the forces acting on the movable system, so as to both check oscillation and overcome the mechanical friction of the movable system.

Figures 3, 4:
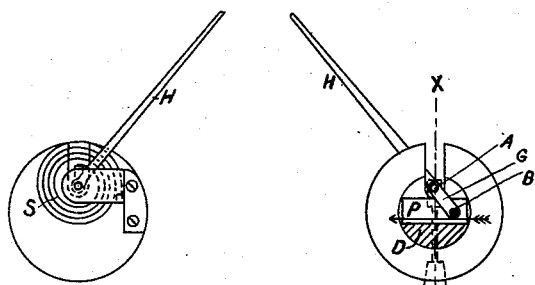

One of the ways of carrying out my invention is shown in Figures 1, 2, 3, and 4 of the drawings attached, showing a plan, elevations, and cross-section, respectively, of the working parts of an instrument in which gravity or a spring is used as the controlling force. Fig. 4 is a view of the arbor fitted with a spring instead of a weight.

Figure 1:
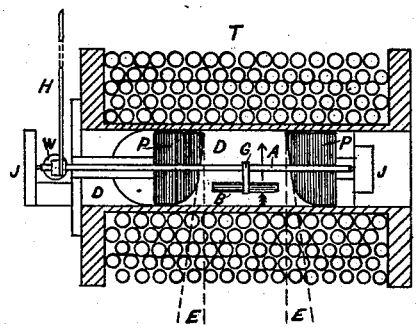
Figure 2:
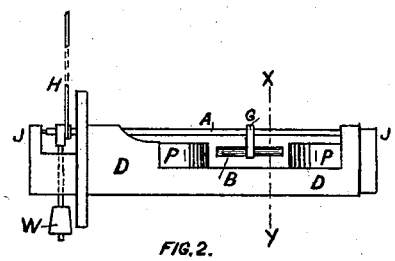

Within a coil T T (shown in section in Fig. 1) I fix a brass plug-piece D, which serves to support a brass arbor A, pivoted in jewel-holes at J J. The arbor has a light brass arm G attached to it at the center of the coil, which arm carries a small rod of soft iron B. This rod lies in a direction parallel to the arbor and to the axis of the coil. An index H is fixed on the arbor outside the coil in a position and of such weight as to balance the rod and arm. Outside the coil another arm carries a weight W to give the controlling force. When no current flows in the coil, the weight W brings the movable system to rest in the position shown in Fig. 3—that is to say, with the arm G and the index H at about forty-five degrees to the vertical. The index H ranges over a suitable scale on a dial in the usual manner. The whole of the working parts of the instrument are thus fixed to the plug D, forming a complete mechanism independent, so far as the relative positions of the blocks P P, rod B, and axle are concerned, of the frame and case of the instrument. The brass plug D is cut away throughout a large portion of its length to a nearly semicircular section, on the flat surface of which are fixed two blocks of soft iron P P, which act as poles, one on each side of the rod B, leaving sufficient space between them to allow of the free rotation of the arbor and rod. The adjacent faces of the blocks are not parallel, but shaped as shown in Fig. 1, so that as the arbor rotates the ends of the rod B approach the faces of the blocks. The range of readings is determined by the angle (indicated in Fig. 1 by the dotted lines E) between the plane of one face of a block and a plane at right angles to the axis of the coil, and I prefer to make this angle about six degrees, which I find gives as long a range as is consistent with an open scale, since the total rotation cannot exceed ninety degrees in an instrument controlled by gravity. One of the corners of each block—namely, that nearest to the zero position of the rod B—is rounded off, as shown, in order to make the scale of the instrument more uniform.

The working of the instrument described above is as follows: The current to be measured flowing in the coil creates a magnetic field, which would be nearly uniform within the coil but for the effect of the blocks P P. The latter not only greatly increase the strength of the field in the space between them, but in consequence of their inclined faces produce a field which is not uniform, being strongest where the faces are nearest. The rod is therefore attracted in the direction of the arrow toward the stronger portion of the field and rotates the arbor until the magnetic attraction is balanced by the force due to the weight W.

Although for most purposes I prefer to use gravity as the controlling force, I do not claim the employment of gravity as part of my invention, and it is obvious that the instrument described may be controlled by a spring S instead of the weight W, acting on the arbor. Thus for use on board ship I modify the construction of the instrument in order that a spring may be used to the best advantage, as shown in Fig. 4.

Instruments constructed according to my invention may have their coils wound either as voltmeters or as ampère-meters, and I prefer to use from two hundred to six hundred ampère-turns on the coil.

Having now described my invention, what I claim is—

1. In an electric measuring-instrument, a coil and blocks of magnetic material arranged therein, in combination with an arbor placed longitudinally in the axis of the coil and carrying a piece of magnetic material adapted to move always with its length parallel to the lines of magnetic force between the said blocks and means for controlling the movement of the said piece.

2. In an electric measuring-instrument, a coil and poles arranged therein having their adjacent faces beveled, so that they must closely approximate, and thus form a greatest magnetic field to one side of the coil-axis, in combination with an arbor journaled within the coil parallel to its axis, a piece of magnetic material carried by the arbor and adapted to move around the coil-axis between the said faces, its length being always parallel to the lines of magnetic force, and means for controlling the movement of the said piece.

3. In an electric measuring-instrument, a coil and an iron core therein recessed to form two poles having their adjacent faces beveled or divergent, so that they closely approximate, and thus form a greatest magnetic field to one side of the coil-axis, in combination with an arbor journaled wholly in the said core and lying in the axis of the coil, a piece of magnetic material carried by the arbor in a position parallel always to the said arbor and to the lines of magnetic force, adapted to move parallel to the axis between the said faces, means for controlling movement of the said piece, a pointer on the arbor, and a dial.

4. In an electric measuring-instrument, a plug-piece carrying an indicating mechanism, in combination with a coil and dial, substantially as set forth.

In testimony whereof I have signed my name to this specification in the presence of two subscribing witnesses.

SYDNEY EVERSHED.

Witnesses:
REGINALD W. JAMES,
RICHARD A. HOFFMANN.